United States Patent [19]

Ketterson et al.

[11] Patent Number: 4,817,124
[45] Date of Patent: Mar. 28, 1989

[54] CHARGED PARTICLE HIGH FREQUENCY LASER

[75] Inventors: John B. Ketterson, Evanston; Slawomir A. Bogacz, New Lenox; George K. Wong, Glenview, all of Ill.

[73] Assignee: Northwestern University, Evanston, Ill.

[21] Appl. No.: 904,718

[22] Filed: Sep. 5, 1986

[51] Int. Cl.$^4$ .............................................. H01S 3/16
[52] U.S. Cl. ....................................... 378/119; 372/5
[58] Field of Search ................... 378/119; 372/5, 2, 9, 372/84, 82, 7

[56] References Cited

U.S. PATENT DOCUMENTS

| | | | |
|---|---|---|---|
| 3,813,555 | 5/1974 | Viecelli | 378/119 |
| 3,822,410 | 7/1974 | Madey | 372/5 |
| 3,967,213 | 6/1976 | Yariv | 372/5 |
| 3,972,008 | 7/1976 | Fletcher et al. | 372/5 |
| 4,229,708 | 10/1980 | Mani et al. | 372/5 |
| 4,660,203 | 4/1987 | Hagelstein | 372/5 |

FOREIGN PATENT DOCUMENTS 61-01046 2/1986 Japan ...................... 372/41

OTHER PUBLICATIONS

Miller, L. D., "Tunable X-Ray Laser from High Energy Accelerator", Optics Communications, vol. 30, No. 1, 7/1/79, pp. 87-89.

Bogacz et al., "Technique to Produce Coherent X-Ray Radition Via Laser Pumping of Relativistic Ion Beam", Appl. Phys. Lett., 19(6), 11 Aug., 1986, pp. 311-313.

Ikezei et al., "Channeling Radiation in a Periodically Distorted Crystal", Physical Review B, Vol. 30, No. 3, 1 Aug., 1984.

Primary Examiner—Carolyn E. Fields
Assistant Examiner—Joseph A. Hynds
Attorney, Agent, or Firm—Welsh & Katz, Ltd.

[57] ABSTRACT

A high frequency laser for generating a coherent collimated beam in the ultraviolet to x-ray range using a high energy charged particle beam is provided. The laser utilizes an undulator which in one embodiment is a solid state superlattice composed of alternating layers of two materials have slightly different lattice spacing to provide strain modulation. A beam of charged particles is injected into the undulator to stimulate emission at short wavelengths in ultraviolet to hard x-ray range. The feedback required for lasing action is provided by Bragg diffraction involving the basic crystal lattice or other mirror device such as a superlattice mirror. In another embodiment, a dynamic undulator is used comprising infrared electromagnetic radiation. High energy Lithium ions are injected into the undulator resulting in stimulation of high frequency radiation. The feedback is provided by a superlattice mirror.

5 Claims, 3 Drawing Sheets

CHARGED PARTICLE HIGH FREQUENCY LASER

This invention relates generally to the field of high frequency lasers and more particularly to apparatus and method for producing monochromatic, coherent electromagnetic radiation in the high frequency (i.e., ultraviolet to hard x-ray) portion of the frequency spectrum.

The generation of lasing action at x-ray wavelengths has been sought since the invention of the laser. Potential uses for such coherent x-ray radiation range over a wide variety of scientific fields including medicine, fusion research and development, high energy physics, microbiology, weapons research and others. Coherent ultraviolet radiation has extensive application over a similarly wide variety of scientific fields.

Continuous progress has been made in achieving lasing action at shorter and shorter wavelengths, recently resulting in lasing at ultraviolet wavelengths. However, practical x-ray lasers have not been developed. Most x-ray sources known in the prior art primarily produced x-rays by bombarding a solid target with an electron beam. In these sources the wavelength of the x-rays generated depends upon the energy of the electrons used to bombard the target. These x-ray sources, however, produce non-coherent, and low intensity x-rays or a broad band of wavelengths. A method of producing coherent x-rays has been proposed using a near infrared laser to irradiate a copper sulfate gel.

In the prior art, free electron lasers have been constructed which provide a tunable source of coherent infrared radiation. Such lasers pass high energy electrons through an array of opposing magnets which serves as an undulator. The wavelength of the stimulated emissions from the undulator are much shorter than the periodicity (i.e. repeat distance) of the undulator while feedback is provided in the conventional manner using mirrors, thereby achieving lasing in the infrared spectrum. However, these prior art free electron lasers cannot achieve lasing at the short wavelengths of ultraviolet and x-ray radiation because of the impossibility of getting individual magnets close enough for the required undulator periodicity, and because of the high field strengths needed to obtain the required gain at such short wavelengths. Further, prior-art lasers have not utilized high energy ions to achieve lasing (i.e. a "free ion laser") at high frequencies.

It is accordingly an object of this invention to provide novel method and apparatus for obtaining high frequency lasing action above visible light frequencies.

It is another object of the invention to provide a free charged particle laser using high energy charged particles such as electrons, positrons or ions moving through an electric or magnetic field having a spatially periodic variation in field strength.

It is yet another object of this invention to provide an x-ray laser utilizing a solid state superlattice undulator to provide a static but periodic spatially varying electric or magnetic field to generate coherent x-ray radiation.

It is yet another object of this invention to provide an x-ray laser utilizing Bragg diffraction to provide a distributed feedback mechanism.

It is yet another object of this invention to provide a high frequency laser using high energy charged particles moving through a dynamic undulator which provides a periodic spatially and temporally varying electromagnetic field.

Briefly, according to one embodiment of the invention, apparatus is provided for producing coherent high frequency radiation comprising a source for producing moving charged particles and an undulator for providing a periodically varying electromagnetic field having a periodicity short enough to stimulate high frequency emissions responsive to the motion of the charge particles through the electromagnetic field.

In one embodiment, the undulator comprises a solid state superlattice with strain modulation while the feedback which permits lasing action is provided by Bragg diffraction from the lattice of the undulator. In another embodiment, the undulator is dynamic comprising electromagnetic radiation with positive lithium ions as the charged particles and a superlattice mirror providing feedback.

BRIEF DESCRIPTIONS OF THE DRAWINGS

The invention, together with further objects and advantages thereof, maybe understood by reference to the following description taken in conjunction with the accompanying drawings FIG. 1 is a generalized diagram illustrating a specific embodiment of high frequency laser according to the invention.

DETAILED DESCRIPTION OF THE PREFERRED EMBODIMENT

Figure 1:
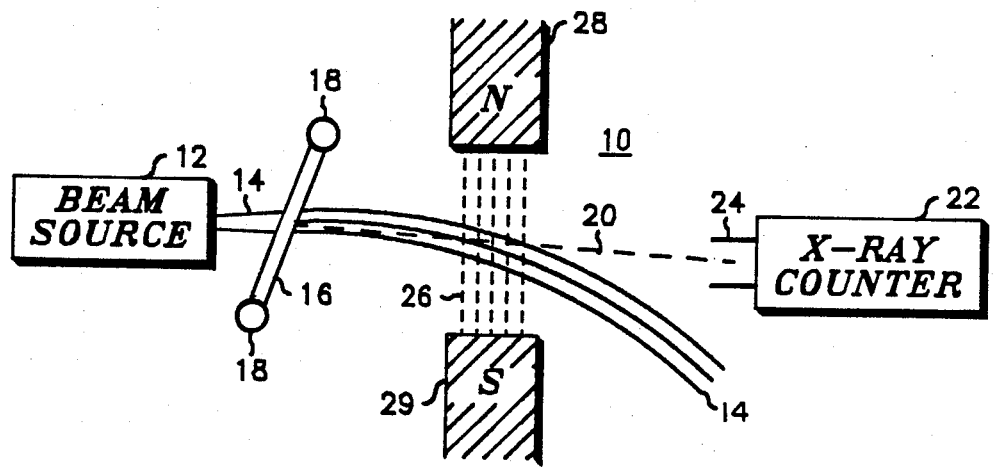

In FIG. 1 there is illustrated a generalized block diagram of a specific embodiment of a high frequency (i.e. higher than the frequency of visible light) laser 10 according to the invention. The illustrated embodiment is an x-ray laser, however, the invention may also be implemented for lower frequencies such as ultraviolet lasers. A source 12 of high energy charged particles 14 (e.g. a $10^9$ to $10^{12}$ ampere/$cm^2$ beam of 50 Mev energy electrons from a particle accelerator) such as electrons or positrons is directed through an undulator 16. The undulator 16 provides an electrical or magnetic field which has a spatial variation in field strength (referred to generically hereinafter as an electromagnetic field) through which the high energy charged particles move. In the illustrated embodiment, a solid state superlattice composed of periodically alternating layers of two different materials is used for the undulator 16. The undulator 16 may be a single piece of undulator superlattice material or, for a longer period of lasing action, a foil mounted on motorized rollers 18 or a rapidly rotating disk so that undulator 16 maybe continuously moved through the particle beam. The x-ray feedback required for x-ray laser action is provided by Bragg diffraction from the basic crystal lattice of the undulator 16.

As a consequence of the stimulated emission of x-rays, a collimated coherent x-ray beam 20 is emitted and may impinge on an x-ray counter 22 through a collimating aperture 24, as shown, or on some other desired target. A magnetic field 26 is provided by magnets 28, 29 to deflect the charged particle beam 14 from the path of x-ray beam 20.

The lasing action in such a free electron laser occurs within the undulator 16 when excited by high energy charged particle (i.e. relativistic particles), such as electrons or positrons, due to radiation emitted by the relativistic particles moving through the periodic electromagnetic field of the undulator 16. The radiation emitted in the frame of reference moving with the electron is Doppler shifted in the observers frame of reference to wavelengths much shorter than the repeat length of the undulator field. To obtain a high field strength with periodicity sufficiently short to obtain xray radiation, a solid state undulator is utilized in the illustrated embodiment.

Figure 2:
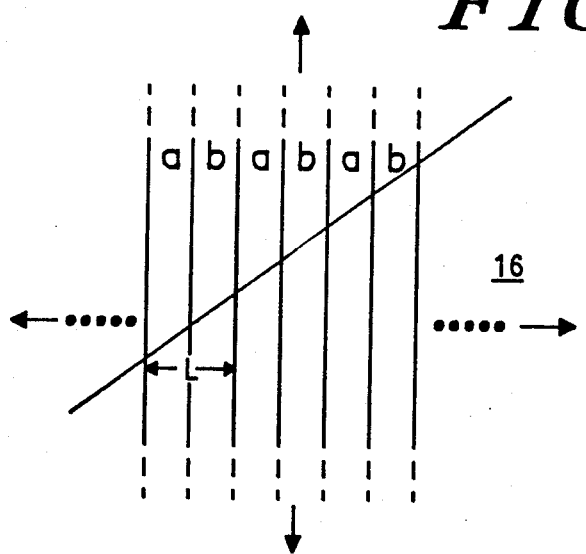
FIG. 2 is a diagrammatic illustration of the structure of a portion of a solid state undulator according to the invention.

Solid state undulator 16 is composed of alternate layers of two materials having different characteristics. FIG. 2 illustrates in diagrammatic form the basic structure of a portion of the solid state undulator 16. As shown, two different materials a and b are alternatively formed with a repeat length (periodicity) of L.

In one embodiment for the x-ray laser, a strain modulated superlattice is formed using two materials with (e.g. silicon [Si] and germanium [Ge]) slightly different lattice constant (i.e. lattice spacing) using a periodicity of approximately 100 Angstroms. Such a superlattice construction can occur naturally in several alloy systems or may be prepared using well known vapor or beam epitaxy techniques. This approach produces a superlattice with an accompanying strain modulation which is the natural consequence of the different lattice spacings of the materials used. For example, for an x-ray laser a suitable strain modulated solid state superlattice can be made by vapor epitaxy using silicon and germanium for forming a continuous crystal lattice structure of alternating layers of silicon and germanium with each layer made approximately 50 Angstroms thick with sufficient layers to obtain a desired thickness (i.e. approximately one micron). This provides a superlattice construction having a periodicity wavelength of 100 Angstroms. The layers may also be composed of a mere variation in the concentrations of each of the two materials.

Figure 3A:
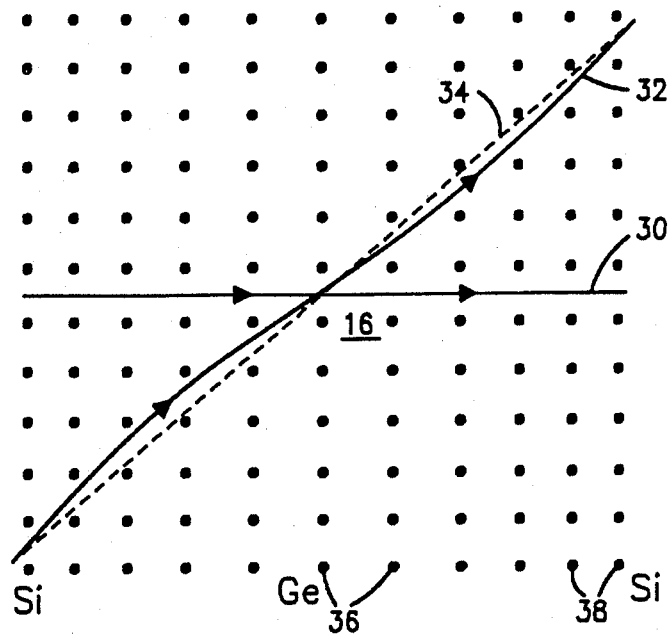
FIG. 3A is a diagrammatic illustration of the atomic structure, and the channeling trajectory for a positron in the [110] direction of a specific embodiment of a portion of a solid state superlattice undulator with strain modulation according to the invention.

A diagrammatic illustration of a strain modulated superlattice 16 for a single superlattice period is provided in FIG. 3A. The lattice spacing between the atoms 36 at the center are closer together than the atoms 38 located one-half of a superlattice period away (note that the lattice spacing differences are exaggerated in the Figures). This provides the strain modulation within the lattice 16 which can be seen by inspection of the straight dotted line 34 illustrating the location of an internuclear channel which normally would exist at a 45 degree angle to the superlattice growth direction (i.e. the [110] direction) in a uniform crystal lattice. In addition, a straight solid line 30 shows an internuclear channel which is parallel to the direction of growth of the crystal. Since a beam of relativistic (i.e. high energy) positrons would channel through the crystal along paths which lie in the low density regions of the crystal, such a beam would channel along such internuclear channels such as illustrated by lines 30 and 34. However, due to the non-uniform lattice spacing of the solid state superlattice, the center of the 45 degree channel "wiggles" or undulates as illustrated by the solid line 32 which follows the center of the actual channel. Thus the line 32 illustrates the center of the positron channeling path which is modulated by the superlattice periodicity. As a result, positrons channeling through the superlattice 16 along the 45 degree channeling path 32 are continuously subjected to alternating electric fields perpendicular to the path of flight.

Figure 3B:
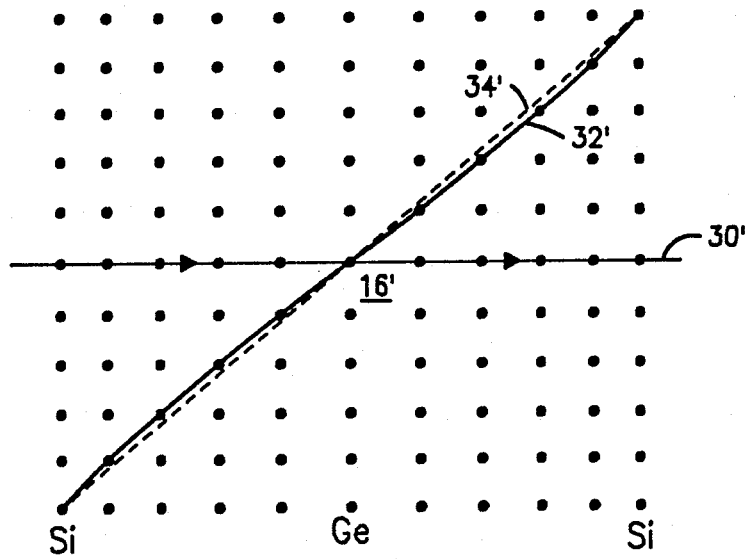
FIG. 3B is a diagrammatic illustration of the atomic structure and the channeling trajectory for an electron in the [110] direction of a specific embodiment of a portion of a solid state superlattice undulator with strain modulation according to the invention.
Figure 3C:
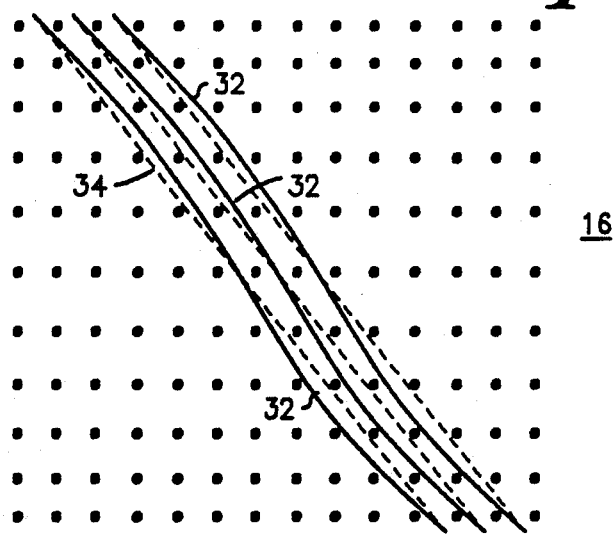
FIG. 3C is a diagrammatic illustration of the atomic structure, and multiple channel trajectories for positrons in the [110] direction, for a specific embodiment of a solid state superlattice undulator with strain modulation according to the invention.

FIG. 3B illustrates the identical concept for an electron beam traversing the same superlattice 16 which will be subjected to the same alternating fields. However, the channel of the electron will lie in the high density regions, as shown. The solid state undulator 16 periodicity can have a wavelength that falls in the range as low as 10 to 100 angstroms or more, which is far shorter than those of a macroscopic undulator. In addition, the electric fields available to act on the electrons or other charged particles involve the line average nuclear field, and therefore can be two or more orders of magnitude larger then the equivalent fields of macroscopic magnetic undulators. This permits the higher gain that is needed to obtain amplification of short wavelengths. FIG. 3C illustrates that the superlattice 16 actually provides an array of many parallel undulating channels.

Lasing action in the x-ray wavelengths can be achieved using the solid state superlattice by injecting a high energy beam of electrons or positrons into the crystal lattice at the 45 degree angle. This causes the emission of electromagnetic radiation at wavelengths far shorter then those of the wavelength of the periodicity of the undulator. The wavelength ($\lambda$) of the emitted radiation is given by the relationship $$\lambda = L \cdot (1 - v^2/c^2)/2$$

where L is the superlattice periodicity, v is the velocity of the electrons or positrons and c is the speed of light.

The feedback mechanism necessary for the lasing action is achieved through Bragg diffraction involving the basic lattice spacing (not the superlattice periodicity wavelength). In the observers frame of reference the wavelength of the undulator emission satisfies the relationship $n\lambda = 2\ d_B$, were $d_B$ is the spacing between neighboring sets of Braggs planes (i.e. planes of atomic nuclei perpendicular to the 45 degree channeling direction), then counter propagating plane waves are set up due to back Bragg diffraction (i.e. standing waves are created just as with the mirrors of a conventional laser). The Bragg condition is satisfied in principle by choosing the incident electron beam energy so as to satisfy the relationship $$2d_B = n\lambda = \frac{nL}{2}\left[1 - \frac{v^2}{c^2}\right].$$

By solving the above equation for the value of v, it can be shown that a 50 million electron volt (Mev) beam of electrons will provide emissions in the x-ray spectrum.

An alternative embodiment of the undulator 16 utilizes a superlattice structure comprising alternating layers of magnetic and non-magnetic materials (e.g. nickel and copper) to form a magnetic undulator. The charged particle beam is injected at an angle, such as 45° to the plane of the layers to obtain an alternating perpendicular magnetic field component acting on the charged particle resulting in stimulated emission of high frequency radiation as in the strain modulation superlattice undulator. Similarly, an electric field superlattice can be constructed using alternating layers of ferroelectric materials (e.g. strained CuCl, and CuBr) to form an undulator with an alternating electric field. With the charged particles injected at an angle to the plane of the layers an alternating electric field component perpendicular to the direction of motion is obtained. Laser feedback in both the embodiments is provided by Bragg diffraction as in the strain modulation superlattice structure.

Figure 4:
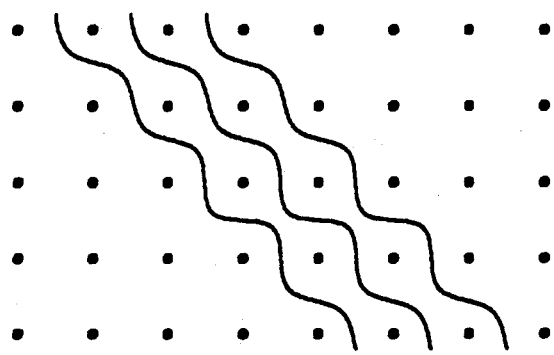
FIG. 4 is a diagrammatic illustration of the atomic structure and channeling trajectory for a positron in a uniform crystal lattice.

Another embodiment of the undulator 16 not using a superlattice employs an unstrained crystal lattice such as silicon (Si) in the [110] direction. In the [110] direction of a simple Si crystal lattice the internuclear channel acts as a positron channel in which the particles are alternately accelerated in opposite directions perpendicular to the direction of propagation due to nuclear electric fields as shown in FIG. 4. Bragg diffraction within the crystal provides the feedback for laser action. A dynamic undulator may also be constructed using a crystal lattice by utilizing the strain field accompanying an acoustic wave. A high amplitude standing acoustic wave can be excited in a crystal of piezoelectric material (e.g. GaAs or CdS) by application of microwave radiation setting up an alternating time dependent crystal field potential which acts upon a charged particle beam traversing the crystal lattice. The crystal lattice again provides feedback by means of Bragg diffraction.

Figure 5:
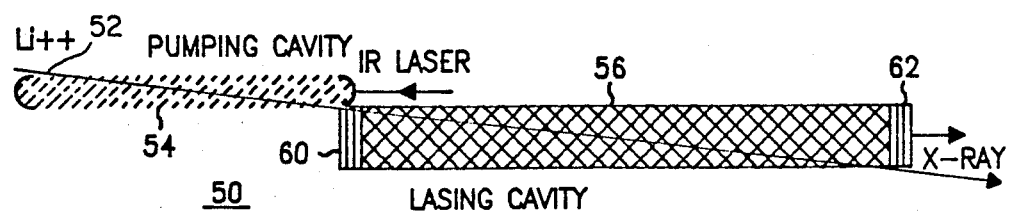
FIG. 5 is a generalized diagram illustrating a specific embodiment of a high frequency laser having a dynamic undulator according to the invention.

In an alternative embodiment illustrated in FIG. 5, a dynamic undulator is utilized in a high frequency charged particle laser 50 (i.e. an x-ray laser in the illustrated embodiment). A high energy ion beam 52 composed of ions (e.g. with a density of approximately $10^5$ amps/cm$^2$) such as hydrogenic positive ions having a positive charge of at least two and having at least one bound electron (e.g. Li$^{++}$ in the illustrated embodiment) is injected at relativistic speeds through a pumping cavity 54 (i.e. dynamic undulator), as shown. The fact that the ions are charged permits the beam to be accelerated to relativistic energies (e.g. approximately 30 GeV per nucleon in the illustrated embodiment using, for example, an alternating gradient synchrotron) where relativistic kinematics dictate that the back scattered radiation will have a wavelength shortened by a factor of $(2\lambda)^2$ (where $\lambda$ equals $$1 / \left[ 1 - \frac{v^2}{c^2} \right]^{\frac{1}{2}}$$

where v is the velocity of the ions). The pumping cavity 54 functions as a dynamic undulator which subjects the ion beam to an alternating electromagnetic field which is changing in both time and space.

The pumping cavity 54 is energized by illuminating the cavity 54 with a laser beam (e.g. infrared radiation of approximately a wavelength of 810 nanometers and several watts of power in the illustrated embodiment supplied, for example, by a CO$_2$ laser) traveling in the opposite direction as the ion particles. Thus, as the relativistic ion beam 52 enters the dynamic undulator cavity 54 and encounters laser radiation traveling in the opposite direction, the frequency of the laser radiation is Doppler shifted to a higher frequency by a factor of $2\gamma$ in the rest frame of reference of the ions. By matching the frequency in the ion frame of reference to an electron transition frequency of one of the remaining bound electrons of the ions (e.g. the 1s—>2p transition for the Li$^{++}$ ion of the illustrated embodiment), the electrons can be excited to a higher energy state. For example, in the illustrated embodiment, the 1s—>2p transition of the relativistic lithium ions is matched to the infrared radiation of the dynamic undulator cavity 54 permitting the radiation to excite the one remaining electron of the lithium ion to the 2p level. In addition, the length of the cavity 54 is such that the interaction path-length (approximately 1.76 centimeters in the illustrated embodiment) corresponds to a time of irradiation of the ion beam 52 sufficient to cause a population inversion (i.e. a $\pi$-pulse condition is created).

The population inverted particle beam 54 immediately enters a lasing cavity 56 after leaving the pumping cavity 54, as shown. The lasing cavity 56 is formed by two X-ray mirrors 60, 62 composed, in the illustrated embodiment, of multi-layer superlattice mirror structures such as are known in the art. The mirror 60, 62 are spaced sufficiently apart (e.g. 22 centimeters in the illustrated embodiment) to allow the ion beam 52 to exist within the cavity long enough for the excited electrons to drop back to the 1s energy state (i.e. emit a photon of electromagnetic radiation). The lasing cavity 56 thus functions as a feedback region such that the inverted population ion beam is subjected to electromagnetic radiation which is amplified by stimulated emission. Due to the relativistic velocity of the ion beam, the emitted radiation in the direction parallel to the beam will have a frequency in the laboratory frame of reference which is a factor of $2\gamma$ greater than that of the radiation which would be emitted in the rest frame of reference. Since relativistic effects produced a factor of $2\gamma$ shift in frequency in the pumping cavity 54, the amplified radiation traveling approximately parallel to and in the direction of the ion beam within the lasing cavity 56 produces stimulated emission which has a wavelength shortened by a factor of $(2\gamma)^2$ from the original pumping wavelength. In the illustrated embodiment, using Lithium ions accelerated to an energy of approximately 30 GeV per nucleon (i.e. $\gamma=30$), this results in an x-ray laser output with a wavelength of approximately 2.25 Angstroms. Clearly, many alternative embodiments to the embodiment illustrated in FIG. 5 will be apparent to those skilled in the art utilizing a wide variety of dimensions, particles, frequencies, energies, and configurations.

Specific embodiments of the x-ray laser according to the invention has been described for purposes of illustrating the manner in which the invention may be made and used. It should be understood that implementation of other variations and modifications of the invention in its various aspects will be apparent to those skilled in the art, and that the invention is not limited by the specific embodiments described. It is therefore contemplated to cover by the present invention any and all modifications, variations, or equivalents that fall within the true spirit and scope of the basic underlying principles disclosed and claimed herein.

What is claimed is:

1. Apparatus for producing coherent x-ray radiation comprising:

source means for producing energetic charged particles;

solid state undulator means comprising a solid state lattice with periodically alternating layers of a magnetic and a non-magnetic material having a periodicity of approximately 100 angstroms for providing a spatially periodic electromagnetic field having a periodicity short enough to stimulate x-ray radiation emission responsive to the charged particles moving through the undulator means electromagnetic fields; and means for providing feedback of the x-ray radiation.

2. The apparatus of claim 1 wherein the feedback is distributed reflective feedback.

3. The apparatus of claim 1 wherein the solid state undulator is a solid state superlattice with strain modulation.

4. The apparatus of claim 1 wherein said solid state lattice is a crystal lattice which provides distributed reflective feedback by means of Bragg diffraction.

5. Apparatus for producing coherent high frequency radiation electromagnetic radiation at a frequency higher than the frequency of visible light, comprising:

source means for producing energetic charged particles;

solid state undulator means comprising a crystal lattice of piezoelectric material excited by microwave energy to create a standing acoustic wave providing a time dependant spatially periodic alternating crystal field potential having a periodicity short enough to stimulate coherent high frequency electromagnetic radiation responsive to the charged particle moving through the undulator means;

feedback means for providing feedback of the high frequency electromagnetic radiation.

* * * * *

UNITED STATES PATENT AND TRADEMARK OFFICE
CERTIFICATE OF CORRECTION

PATENT NO. : 4,817,124

DATED : March 28, 1989

INVENTOR(S) : Ketterson et al.

It is certified that error appears in the above-identified patent and that said Letters Patent is hereby corrected as shown below:

In the Abstract, line 9, insert "the" after "in".

Column 1, line 46, "prior-art" should be --prior art--.

Column 1, line 49, after "provide" insert --a--.

Column 3, line 5, "maybe" should be --may be--.

Column 3, line 27, "xray" should be --x-ray--.

Column 5, line 59, "$(2\lambda)^2$" should be $(2\gamma)^2$.

Column 5, line 59, "$\lambda$ equals" should be --$\gamma$ equals--.

Signed and Sealed this

Twenty-eighth Day of November 1989

Attest:

JEFFREY M. SAMUELS

*Attesting Officer*     *Acting Commissioner of Patents and Trademarks*